United States Patent Office 2,977,206
Patented Mar. 28, 1961

2,977,206
SILICON CARBIDE ABRADING WHEELS

Vernal L. Sheets, Valparaiso, Ind., assignor to Chicago Wheel & Manufacturing Company, Chicago, Ill., a corporation of Illinois No Drawing. Filed July 30, 1958, Ser. No. 751,828

2 Claims. (Cl. 51—308)

This invention relates to the manufacture of silicon carbide abrading wheels.

Vitrified ceramic bonding of silicon particles in a silicon carbide abrading wheel has been the subject of a considerable amount of research over the years, and this is primarily accounted for by difficulties experienced in obtaining good wetting of the carbide particles by the vitrified ceramic bond material, and the tendency for most fluxing agents to chemically attack silicon carbide. Other difficulties encountered have been the tendency of silicon carbide to oxidize at the elevated temperature used to produce fusion of the ceramic bond, and additionally it has been observed that during green molding prior to firing there is a strong tendency for the fluxing agents to migrate toward the surface of the molded article, resulting in excesses of the flux at the surfaces and deficiencies within the body. Resultantly, the abrading wheel is characterized by variations in hardness between the surface and the interior.

The foregoing are some of the extreme problems encountered in the manufacture of silicon carbide wheels, and the primary object of the present invention is to overcome these by way of a novel ceramic bond for silicon carbide particles, and additionally to afford a bond wherein there is absent any material having even slight water solubility. Absence of water soluble ingredients allows storage of the prepared bond mix on the shelf for prolonged periods, and at the same time eliminates production difficulties otherwise due to hygroscopicity.

Specifically, it is an object of the present invention to achieve higher efficiency (at least ten percent) in silicon carbide wheels as evidenced by modulus of rupture data, in comparison to the heretofore best known silicon carbide formulations for abrading wheels.

The foregoing objects are obtained under the present invention by a ceramic bond for silicon carbide abrasive particles comprising feldspar, flint, clay, a lithium-borosilicate glass frit, lithium manganite and molybdenum in combination. The clay can be of various grades including Kaolin, China clay and ball clay, and the feldspar used under the present invention is a generic designation for many different kinds of alkali-alumina-silicate minerals of which the more notable or common forms are the orthoclase feldspars, plagioclase feldspars, nepheline and so on, these minerals serving primarily as a combined source of the essential fluxing agent and glass-forming constituents.

The clay in addition to glass-forming constituents imparts the needed plastic molding properties to the mix, and the flint (quartz, sand and so on) is the primary source of pure silica for achieving what in effect is a porcelain-type ceramic bond in the present instance.

Very probably the final bond is a complex ceramic obtained from all the active ingredients in combined form. I believe that the combination lithium-borosilicate glass frit and molybdenum metal cooperate first to produce early wetting of the silicon carbide particles at an early stage during firing, thereby reducing oxidation and chemical attack of silicon carbide, and the reaction product of this mixture so combines chemically with or modifies the later melting ceramic binder (feldspar, clay, flint) and lithium manganite as to result in good surface tension creepage of the whole binder on and about the silicon carbide particles resulting in greater area contact between the final vitrified binder and the silicon carbide particles. Thus, I believe that instead of forming eliptical beads which join to the silicon carbide particles at convex meniscus angles less than 90°, the ceramic binder under the present invention finally spreads with a concave meniscus effect about the silicon carbide particles.

Another object of the present invention is to incorporate naturally occurring calcium silicate in the form of the mineral wollastonite ($Ca_3Si_3O_9$) in the binder mixture, and this results in reduced firing shrinkage, increased green strength and improved molding properties, with no marked disadvantageous results in respect of the ceramic binder in spite of the fact that it is known that calcium compounds usually result in a short firing range and rather sudden liquification when used as a flux. Wollastonite is acicular in shape, occurs naturally in fibrous masses, and has uneven fracture. These physical characteristics plus its compatible chemical constituency apparently account for the unexpected results.

Other and further objects of the present invention will be apparent from the following description which by way of illustration sets forth preferred embodiments of the present invention based on the principles thereof, and what I now consider to be the best mode contemplated for applying these principles. Other embodiments of the present invention embodying the same or equivalent principles may be used, and changes may be made by those skilled in the art without departing from the present invention and the purview of the appended claims.

The following is an example of the dry ingredients from which the vitrified ceramic bond is derived under the present invention:

EXAMPLE I.—BINDER INGREDIENTS

| Material: | Parts by weight |
|---|---|
| Feldspar | 27 |
| Flint (325 mesh $SiO_2$) | 26 |
| Wollastonite | 2 |
| Kaolin | 39 |
| Lithium manganite | 2 |
| Lithium-borosilicate glass frit (contains 6.1% by weight molybdenum) | 4 |

The glass frit in the above example is derived from a mixture of flint (45% by weight), boric acid (40% by weight) and lithium carbonate (15% by weight), and advantageously the molybdenum is fritted with this mixture since so to do has been found to subdue undesirable high temperature volatilization of molybdenum due to transformation thereof to its free oxide during the final firing of the complete mix. Where another mode of preventing this volatilization loss of molybdenum is found or known, the molybdenum can be omitted from the frit and added to the mixture in other form.

The above example has been found, based on extensive experimentation, to produce the best results when combined with sixty to ninety-three percent by weight of silicon carbide particles, (extremely fine to relatively coarse) and hardness of the resultant abrading material will vary directly with the amount of Example I binder. Thus, the following are typical binder-silicon carbide dry mixtures (parts by weight) for producing silicon carbide abrading wheels in accordance with the present invention:

|                                     | Example II | Example III |
|-------------------------------------|------------|-------------|
| Example I Binder                    | 7          | 30          |
| Silicon Carbide (8 to 600 mesh)     | 93         | 70          |

Based on experimental investigation, and bearing in mind that it is possible to divorce the molybdenum from the lithium-borosilicate glass frit, the following is the extrapolated optimum ranges of the binder ingredients based on extensive experimental observations:

EXAMPLE IV

| Material: | Parts by weight |
|---|---|
| Feldspar | 15–40 |
| Flint | 15–40 |
| Wollastonite | 0–10 |
| Kaolin | 20–50 |
| Lithium manganite | 1–5 |
| Lithium-borosilicate glass frit | 1–10 |
| Molybdenum | 0.05–6 |

In producing abrading wheels in accordance with the foregoing examples, standard processing techniques well known in the art are followed. First, a weighed amount of the silicon carbide particles are dumped in a mixer and wet with a small amount of a temporary binder such as glutens, gums, and so on which is a well understood step. Next, the dry binder ingredients within the ranges set forth in Examples I and IV above are added batch-wise to the wetted silicon carbide in the mixer in an amount predetermined to produce the desired hardness of a finished abrading wheel, whereafter the mixer is agitated to properly mix the contents therein. After the required mix consistency has been obtained in the mixer, selected amounts of the mixed silicon carbide and binder ingredients are withdrawn from the mixer, and these are added to molds where pressure is applied to produce self-sustaining consolidated "green" wheels or discs which next are to be fired.

Firing of the green wheels is gradually cycled up to about 2300° F. (cone 10) in twenty-four hours for small parts. For larger parts, the maximum temperature remains the same, but the time range is appropriately extended. The finished articles are then permanently associated with mandrels in accordance with known practices resulting in the ultimate mounted abrading wheels of commerce which, for example, have an outward appearance typified by the mounted abrading wheel illustrated in Fig. 1 of United States Patent No. 2,796,705.

It should be mentioned that the wollastonite, in addition to imparting greater strength to the "green" wheels and imparting better molding properties to the ingredients removed from the mixer, greatly reduces firing shrinkage, thereby assuring more ultimate certainty of uniform dimension of mass-produced abrading wheels. This effect of the wollastonite is achieved while still maintaining all the advantages of the presence of molybdenum, the lithium-borosilicate glass and lithium manganite, and hence it is quite evident that the latter ingredients are wholly compatible with wollastonite.

As evidence of the improvement afforded by the combined presence of lithium manganite on one hand, and the fritted mixture of molybdenum and lithium-borosilicate glass on the other, reference is made to the data in Table I. These data include modulus of rupture values evidencing ultimate strength, and fired or final weight evidencing relative volatile contents. All test bars had an initial raw weight of 173.3 grams, and all conditions were held constant except that the "791" bars included lithium-manganite, in addition to molybdenum and the lithium-borosilicate frit, in a given total weight corresponding to Example I above, whereas the bond for the "79PM" test bars included molybdenum and the frit having said total weight but without lithium-manganite.

Table I

| Bar No. | 79PM* | | | 791** | | |
|---|---|---|---|---|---|---|
| | Fired Weight | Break, lbs. gauge | Modulus, p.s.i. | Fired Weight | Break, lbs. gauge | Modulus, p.s.i. |
| 1 | 159.7 | 398 | 2,390 | 160.8 | 415 | 2,490 |
| 2 | 159.6 | 376 | 2,256 | 160.8 | 440 | 2,640 |
| 3 | 159.7 | 398 | 2,388 | 160.9 | 405 | 2,430 |
| 4 | 159.6 | 400 | 2,400 | 160.4 | 390 | 2,340 |
| 5 | 159.5 | 400 | 2,400 | 160.9 | 428 | 2,568 |
| 6 | 159.5 | 399 | 2,394 | 160.5 | 450 | 2,700 |
| 7 | 159.6 | 401 | 2,406 | 160.5 | 415 | 2,490 |
| 8 | 159.5 | 395 | 2,370 | 160.9 | 440 | 2,640 |
| 9 | 159.5 | 407 | 2,442 | 160.9 | 390 | 2,340 |
| 10 | 159.6 | 400 | 2,400 | 160.9 | 438 | 2,628 |
| 11 | 159.6 | 420 | 2,520 | 160.8 | 385 | 2,310 |
| 12 | 159.6 | 415 | 2,490 | 158.5 | 385 | 2,310 |
| 13 | 157.0 | 345 | 2,070 | 158.0 | 395 | 2,370 |
| 14 | 157.4 | 410 | 2,460 | | | |
| | Average Modulus 2,242 Average Fired Weight 159.2 | | | Average Modulus 2,481 Average Fired Weight 160.3 | | |

*Three abnormally low values rejected.
**No abnormally low values.

On a weight-to-weight basis, then, it will be seen that distinct advantages occur from use of the lithium manganite-molybdenum-lithium borosilicate glass frit bond additive (791) in comparison to the bond additive (79PM) consisting only of molybdenum and lithium borosilicate glass frit. However, it is essential to use the molybdenum-lithium borosilicate mixture in the first instance, since this is what accounts for early vitrified ceramic wetting of the silicon carbide particles, that is, during the early stage of high temperature cure firing, safeguarding the abrasive particles against attack when the final firing temperature (2300° F.) is approached whereat the flint-feldspar-clay ceramic commences to melt.

Aside from theory of action, what the lithium manganite additive does is achieve a type of final bond (and possibly less volatility) that cannot be achieved by this material alone, or by the molybdenum-containing frit additive alone, were either additive to be present on the same weight basis as in combination. Hence, while I have described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A silicon carbide abrading material comprising silicon carbide particles bonded by a vitrified ceramic binder consisting essentially of the following composition approximately in the proportions set forth, namely:

| Material: | Parts by weight |
|---|---|
| Feldspar | 15–40 |
| Flint | 15–40 |
| Clay | 20–50 |
| Lithium-manganite | 1–5 |
| Lithium-borosilicate glass | 1–10 |
| Molybdenum | 0.05–6 |

2. A material according to claim 1 containing up to about ten percent by weight of wollastonite.

References Cited in the file of this patent

UNITED STATES PATENTS

| 2,356,938 | Lombard | Aug. 29, 1944 |
| 2,730,439 | Houchins | Jan. 10, 1956 |
| 2,866,698 | Kusmick | Dec. 30, 1958 |
| 2,873,181 | Hanford | Feb. 10, 1959 |